(No Model.)

R. J. HODGE.
FISH TRAP.

No. 527,606. Patented Oct. 16, 1894.

WITNESSES
A. D. Harrison
Parker Davis

INVENTOR:
R. J. Hodge,
by Wright, Brown & Crosley,
Attys

UNITED STATES PATENT OFFICE.

ROBERT JANIAN HODGE, OF BOSTON, MASSACHUSETTS.

FISH-TRAP.

SPECIFICATION forming part of Letters Patent No. 527,606, dated October 16, 1894.

Application filed December 2, 1893. Serial No. 492,611. (No model.)

*To all whom it may concern:*

Be it known that I, ROBERT JANIAN HODGE, of Boston, in the county of Suffolk and State of Massachusetts, have invented certain new and useful Improvements in Fish-Traps, of which the following is a specification.

The object of the present invention is to provide a trap of such construction that fish will naturally enter the same, and when once inside cannot escape.

To this end the invention consists in a suitable inclosure provided in one side with a vertically-extending outside entrance, and an inclosed passage-way extending therefrom across the inclosure to the opposite side thereof which closes the end of the passage-way, and being provided with a horizontally extending elongated entrance in the under side affording communication between the passage-way and the inclosure.

The invention is illustrated in the accompanying drawings, of which—

The same letters of reference indicate the same parts in both the figures.

Figure 1:
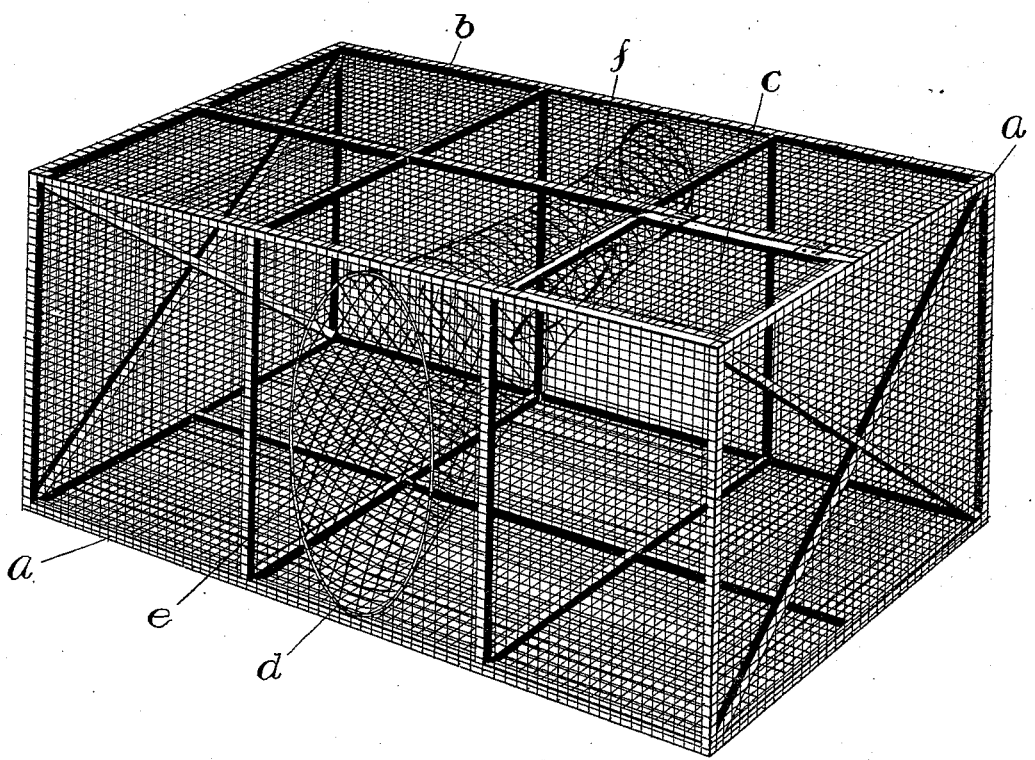
Figure 1 shows a perspective view of a trap constructed in accordance with my invention.
Figure 2:
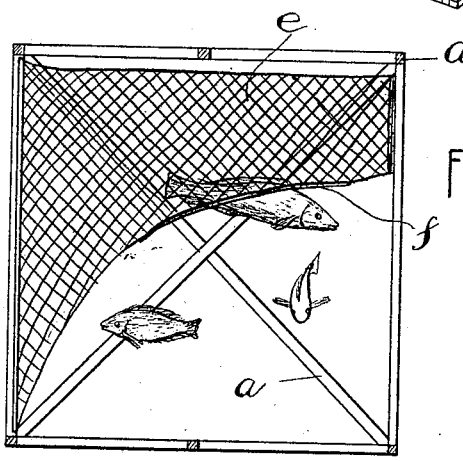
Fig. 2 shows a central cross-section.

The inclosure may be of any suitable form or construction, and is here shown as composed of a frame $a$, and a covering or network $b$ of wire or any other suitable material. A door $c$ may be provided in the top of the inclosure, by which to introduce bait and remove the fish.

In one side of the inclosure a vertically-extending opening $d$ is formed; and a passage-way $e$, formed of net-work the same as the covering of the inclosure, extends from said opening $d$ across the inclosure to the rear side of the same, where it is closed by the covering $b$.

In the lower side of the passage-way $d$ a horizontally-extending elongated opening $f$ is formed, which establishes communication between the said passage-way and the interior of the inclosure.

It is well known that it is unnatural for a fish to swim directly upward, and this fact has been taken advantage of in the construction of my improved trap, for it will be observed that, while the main or outside entrance $d$ extends vertically, which affords natural entrance for the fish, the inner opening $f$ extends horizontally and is on the under side of the passage-way $e$, so that the fish swims in a downward direction out of the passage-way $e$ into the main inclosure; and, in order to escape from said main inclosure, the fish would be compelled to swim directly upward through the opening $f$.

The invention is well calculated to provide a means for conveniently and successfully trapping fish.

It is evident that the invention is not limited to the precise structure here shown, and may be embodied in various other forms.

Having thus explained the nature of the invention and described a way of constructing and using the same, although without attempting to set forth all of the forms in which it may be made or all of the modes of its use, it is declared that what is claimed is—

A fish-trap comprising in its construction an outside inclosure having a vertically-extending inlet opening, and a horizontal passage-way extending across the interior of said outside inclosure from the inlet-opening therein to the opposite side of the inclosure which closes that end of the passage-way,— the said passage-way having an opening in its under side providing communication between the passage-way and the outside inclosure.

In testimony whereof I have signed my name to this specification, in the presence of two subscribing witnesses, this 13th day of November, A. D. 1893.

ROBERT JANIAN HODGE.

Witnesses:
ARTHUR W. CROSSLEY,
A. D. HARRISON.